United States Patent
Becker et al.

(10) Patent No.: US 6,816,325 B1
(45) Date of Patent: Nov. 9, 2004

(54) MOUNTING APPARATUS FOR AN OPTICAL ELEMENT

(75) Inventors: Jochen Becker, Rengsdorf (DE); Bernhard Gellrich, Aalen (DE); Werner Lang, Geislingen (DE); Alexander Kohl, Aalen (DE); Sascha Kraus, Aalen (DE)

(73) Assignee: Carl Zeiss SMT AG, Oberkochen (DE)

( * ) Notice: Subject to any disclaimer, the term of this patent is extended or adjusted under 35 U.S.C. 154(b) by 0 days.

(21) Appl. No.: 10/661,183

(22) Filed: Sep. 11, 2003

(51) Int. Cl.$^7$ ................................................. G02B 7/02
(52) U.S. Cl. ..................... 359/819; 359/822; 359/811; 359/813
(58) Field of Search ................................ 359/819, 822, 359/823, 826, 811, 813

(56) References Cited

U.S. PATENT DOCUMENTS

| | | | |
|---|---|---|---|
| 3,917,385 A | 11/1975 | Caswell ...................... 359/822 |
| 5,428,482 A | 6/1995 | Bruning et al. ............. 359/827 |
| 5,537,262 A | 7/1996 | Aoki et al. .................. 359/822 |
| 6,144,511 A | * 11/2000 | Umetsu et al. ............. 359/831 |
| 6,275,344 B1 | 8/2001 | Holderer ..................... 359/822 |
| 6,307,688 B1 | 10/2001 | Merz et al. ................. 359/819 |
| 6,580,570 B2 | 6/2003 | Becker et al. .............. 359/819 |
| 6,603,615 B2 | 8/2003 | Melzer et al. .............. 359/823 |
| 2002/0001142 A1 | 1/2002 | Osterried ................... 359/819 |
| 2002/0021504 A1 | 2/2002 | Bayer et al. ............... 359/827 |

FOREIGN PATENT DOCUMENTS

| | | |
|---|---|---|
| CH | 371906 | 10/1963 |
| DE | 1 675 685 | 1/1970 |
| DE | 30 30 549 A1 | 2/1982 |
| DE | 3406907 A 1 | 10/1984 |
| DE | 41 36 580 A1 | 5/1993 |
| DE | 199 08 554.4 | 3/1999 |
| DE | 198 25 716 A 1 | 12/1999 |
| DE | 199 10 947 A 1 | 9/2000 |
| EP | 0 053 463 A2 | 6/1982 |
| EP | 0 230 277 A2 | 7/1987 |
| EP | 0 597 209 A1 | 9/1993 |
| EP | 0 964 281 A1 | 12/1999 |
| EP | 1 209 500 A2 | 5/2002 |

* cited by examiner

Primary Examiner—Tim Thompson
(74) Attorney, Agent, or Firm—Wells St. John P.S.

(57) ABSTRACT

In the case of a mounting apparatus, an optical element having an inner mount and an outer mount, in particular a lens in a projection lens system for semiconductor lithography, the inner mount is connected to the outer mount via three circumferentially distributed articulations. Manipulators, whereby said inner mount is displaceable, act on the articulations. The articulations comprise a mechanism which transforms a radial movement into an axial movement.

45 Claims, 2 Drawing Sheets

MOUNTING APPARATUS FOR AN OPTICAL ELEMENT

TECHNICAL FIELD

The invention relates to a mounting apparatus for an optical element and more particularly to a mounting apparatus for mounting a lens.

BACKGROUND OF THE INVENTION

Optical elements, e.g. lenses, have to be installed and adjusted very precisely in relation to their mechanical reference, in particular, in lens systems for semiconductor lithography. It is thus the case, eg. with lenses, that the optical axis has to be made to coincide as precisely as possible with the ideal mechanical axis.

The Applicant's earlier application P 199 08 554.4 discloses a three-point mounting via solid-state rotary articulations with solid-state transitions which can be adjusted by manipulators. A three-point mounting is also known from U.S. Pat. No. 3,917,385.

SUMMARY OF THE INVENTION

The object of the present invention is to improve the hitherto known installation and adjustment mounting method by an integrated fine-tuning functional unit, in order to achieve higher positioning accuracy.

Methods and apparatuses for achieving this object are described. In one embodiment, a mounting apparatus for an optical element includes an inner mount and an outer mount, the inner mount being connected to the outer mount via three circumferentially distributed articulations. An exemplary mounting apparatus is disclosed in U.S. Pat. No. 6,580,570, issued Jun. 17, 2003, to Becker et al., which is incorporated herein by reference. Manipulators act on the articulations wherein said inner mount is displaceable, and wherein the articulations comprise a mechanism which transforms a radial movement into an axial movement. In another embodiment, the mounting apparatus is for mounting a lens in a projection lens system for semiconductor lithography. In another embodiment, the articulations comprise at least one lever for transforming the radial movement into an axial movement, wherein the manipulators act on said at least one lever. In another embodiment, the articulations comprise at least one bell crank lever with attachment points between the inner mount and the outer mount. The outer mount is located in the region of the outer ends of a first lever of the at least one bell crank lever and the manipulators act in the region of the outer end of a second lever of the at least one bell crank lever which is in an angle to the first lever.

In another embodiment, the articulations comprise at least one T-shaped lever in cross section, with a T-bar and a T-support, attachment points between the inner mount and the outer mount being located in each case in the region of the outer ends of the T-bar, and the manipulators acting on the T-support in each case, this embodiment being disclosed in U.S. Pat. No. 6,580,570, previously incorporated herein by reference.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
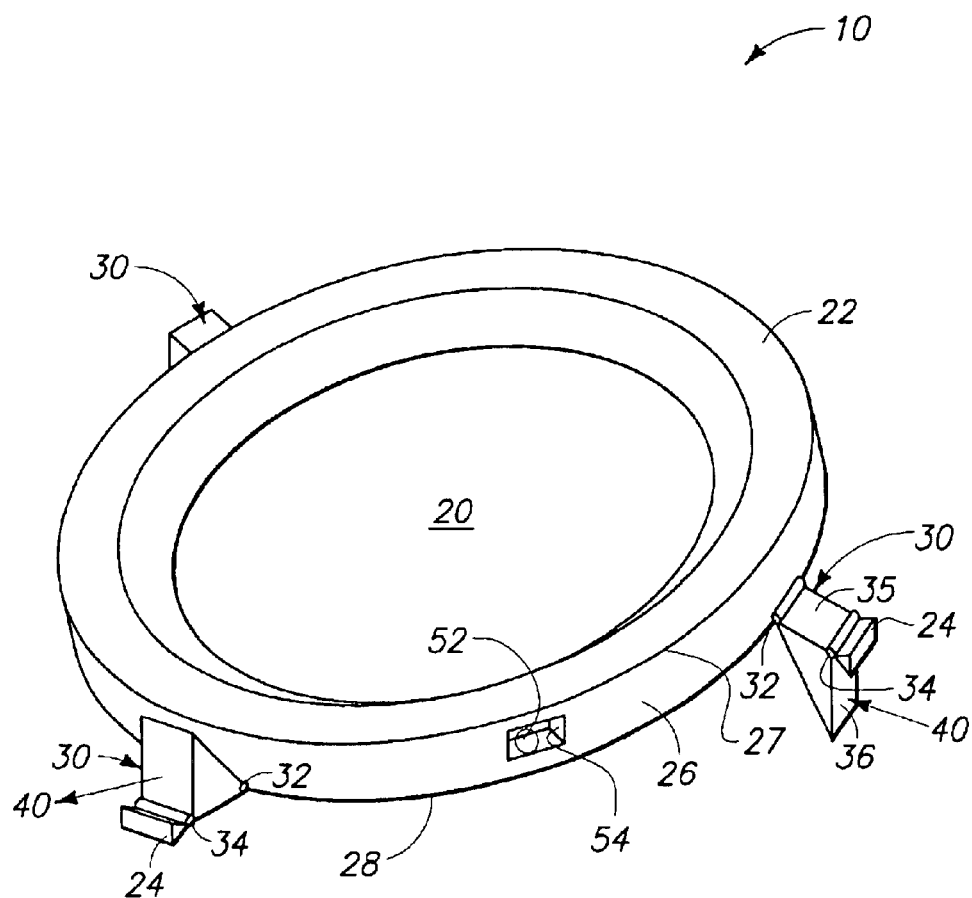
FIG. 1 shows a basic perspective illustration of the three-point mounting with the articulations according to the invention.

According to the illustration in FIG. 1, an exemplary mounting apparatus 10 is shown. An optical element 20 is mounted in an inner mount 22, which is connected to an outer mount 24 via a plurality of circumferentially distributed articulations 30. An exemplary optical element includes a lens 20 for a projection lens system sued in semiconductor lithography processing. The number of exemplary plurality articulations 30 include three as shown. However, it should be understood that one or any number of articulations 30 could be used in the scope of this invention, and oriented circumferentially in any matter along inner mount 22. For reasons of clarity, the outer mount 24 is only indicated at the attachment points in FIG. 1. Inner mount 22 has a circular sidewall 26 with an upper edge 27 and lower edge 28. An exemplary articulation 30 includes a bell crank lever 30 rotatably secured between inner and outer mounts 22 and 24 by pivots or attachment points 32 and 34. Attachment points 32 and 34 are located between the inner mount 22 and the outer mount 24 and at an outer end of a first lever 35 of the bell crank lever 30. A second lever 36 of the bell crank lever 30 is located perpendicularly or rectangularly to the first lever 35. A manipulator 40 (referenced only by direction arrow 40) provides a force to the outer end of the second lever 36 and subjects second lever 36 to tensile and/or compressive forces. As a result of the force by manipulator 40 and the kinematics of the bell crank lever 30, the inner mount 22 is displaced in an upward or a downward direction by transforming a radial movement into an axial movement. Exemplary manipulators include mechanical, electrical, hydraulic and pneumatic actuating members as understood by those skilled in the art, and an exemplary location for such manipulator is in the outer mount 24 (not shown).

FIG. 1 further illustrates in principle how position determination can be carried out, for example, by a capacitive sensor 52, which may be located in a recess 54 between the inner mount 22 and the outer mount 24. For this purpose, of course, it is necessary to have a plurality of capacitive sensors 52 correspondingly distributed over the circumference of inner mount 22.

Figure 2:
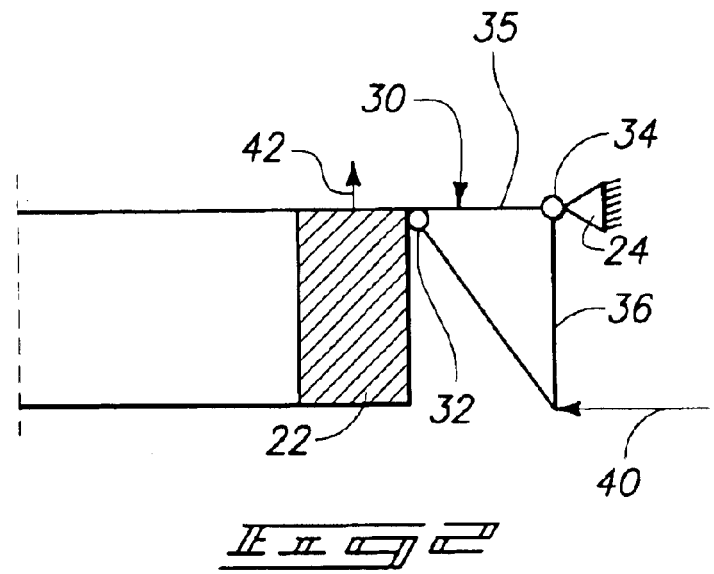
FIG. 2 shows a basic illustration of a first embodiment of an articulation.

FIG. 2 shows a first exemplary embodiment of an articulation illustrated as a bell crank lever 30. The attachment points 32 and 34 are positioned between the inner mount 22 and the outer mount 24 generally coextensive with the upper edge 27 of circular sidewall 26 of inner mount 22. In this orientation of bell crank lever 30, the second lever 36 extends downward from attachment point 34 generally spaced from and along circular sidewall 26. Manipulator 40 provides a compressive force to the outer end of the second lever 36 and moves the outer end of the second lever 36 radially to drive inner mount 22 and optical element 20 axially upward in direction 42. Alternatively, manipulator 40 provides a tensile force to the outer end of the second lever 36 and moves the outer end of the second lever 36 radially to drive inner mount 22 and optical element 20 axially in a direction opposite to direction 42.

Figure 3:
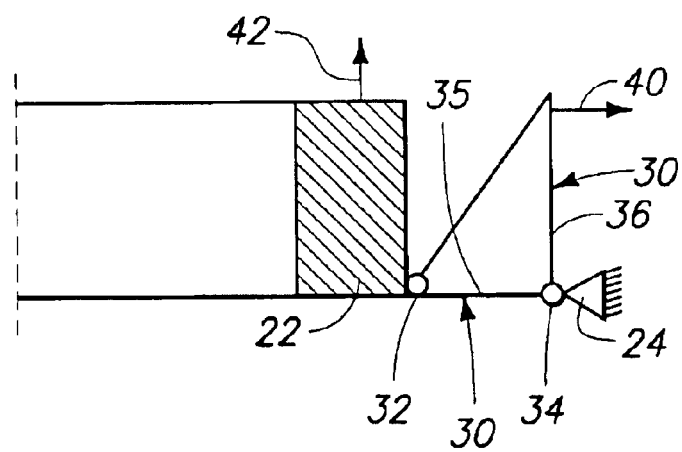
FIG. 3 shows a basic illustration of a second embodiment of an articulation.

FIG. 3 shows a second exemplary embodiment of an articulation illustrated as a bell crank lever 30. The attachment points 32 and 34 are positioned between the inner mount 22 and the outer mount 24 generally coextensive with the lower edge 27 of circular sidewall 26 of inner mount 22. In this orientation of bell crank lever 30, the second lever 36 extends upward from attachment point 34 generally spaced from and along circular sidewall 26. Manipulator 40 provides a tensile force to the outer end of the second lever 36 and moves the outer end of the second lever 36 radially to drive inner mount 22 and optical element 20 axially upward in direction 42. Alternatively, manipulator 40 provides a compressive force to the outer end of the second lever 36 and moves the outer end of the second lever 36 radially to drive inner mount 22 and optical element 20 axially in a direction opposite to direction 42.

It should be understood that manipulator 30 can be rotatably secured to inner mount 22 by attachment point 34 between upper and lower edges 27 and 28 at any location of circular sidewall 26. It should be understood that any combination of articulations 30 can be used, for example, all the articulations 30 secured to mounting apparatus 10 could be bell crank levers, or all could be the one T-shaped articulations disclosed in U.S. Pat. No. 6,580,570, previously incorporated herein by reference, or any combination of differently designed articulations.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A mounting apparatus for an optical element, comprising:
   an inner mount;
   an outer mount, the inner mount being connected to the outer mount via three circumferentially distributed articulations; and
   manipulators configured to act on the articulations, wherein said inner mount is displaceable, and wherein the articulations comprise a mechanism which transforms a radial movement into an axial movement.

2. The apparatus as claimed in claim 1, wherein said mechanism comprises at least one lever for transforming the radial movement into an axial movement, wherein said manipulators act on said at least one lever.

3. The apparatus as claimed in claim 2, wherein said mechanism comprises at least one bell crank lever with attachment points between said inner mount and said outer mount and being located in the region of the outer ends of a first lever of said at least one crank lever, and said manipulators acting in the region of the outer end of a second lever of said at least one crank lever which is in an angle to said first lever of said at least one crank lever.

4. The apparatus as claimed in claim 3, wherein said first and said second lever of said at least one crank lever are perpendicular to each other.

5. The apparatus as claimed in claim 2, wherein said lever of said mechanism changes the transmission proportion of said transfer from radial movement to axial movement.

6. The apparatus as claimed in claim 5, wherein said lever of said mechanism is located outside of the geometry of said inner mount and of said outer mount resulting in a greater force to said inner mount.

7. The apparatus as claimed in claim 1, wherein said articulations are built up from separate parts.

8. The apparatus as claimed in claim 1, further comprising sensors provided for position determination of said inner mount.

9. The apparatus as claimed in claim 8, wherein said sensors are designed as capacitive sensors.

10. The apparatus as claimed in claim 1, wherein said manipulators provided are hydraulic or pneumatic actuating members.

11. The apparatus as claimed in claim 1, wherein said manipulators provided are mechanical actuating members.

12. The apparatus as claimed in claim 1, wherein said manipulators provided are electrical actuating members.

13. The apparatus as claimed in claim 1, wherein said manipulators for the individual articulations can be actuated separately in each case.

14. A mounting apparatus for mounting a lens in a projection lens system for semiconductor lithography, comprising:
   an inner mount;
   an outer mount, the inner mount being connected to the outer mount via three circumferentially distributed articulations; and
   manipulators configured to act on the articulations, wherein said inner mount is displaceable, and wherein the articulations comprise a mechanism which transforms a radial movement into an axial movement.

15. The apparatus as claimed in claim 14, wherein said mechanism comprises at least one lever for transforming the radial movement into an axial movement, wherein said manipulators act on said at least one lever.

16. The apparatus as claimed in claim 15, wherein said mechanism comprises at least one bell crank lever with attachment points between said inner mount and said outer mount being located in the region of the outer ends of a first lever of said at least one crank lever, and said manipulators acting in the region of the outer end of a second lever of said at least one crank lever which is in an angle to said first lever of said at least one crank lever.

17. The apparatus as claimed in claim 16, wherein said first and said second lever of said at least one crank lever are perpendicular to each other.

18. The apparatus as claimed in claim 14, wherein said manipulators for said individual articulations can be actuated separately in each case.

19. The apparatus as claimed in claim 14, further comprising sensors provided for position determination of the inner mount.

20. The apparatus as claimed in claim 19, wherein said sensors are designed as capacitive sensors.

21. The apparatus as claimed in claim 14, wherein said manipulators provided are hydraulic or pneumatic actuating members.

22. The apparatus as claimed in claim 14, wherein said manipulators provided are mechanical actuating members.

23. The apparatus as claimed in claim 14, wherein said manipulators provided are electrical actuating members.

24. A mounting apparatus for an optical element, comprising:
   an outer mount;
   an inner mount arranged within said outer mount;
   an optical element being adapted to said inner mount; and
   at least three articulations circumferentially arranged around said inner mount and between said inner mount and said outer mount, wherein each of said at least three articulations comprise a mechanism which transforms a radial movement into an axial movement.

25. The mounting apparatus of claim 24, wherein said manipulators provide a direction of force which is perpendicular to said axial movement.

26. The apparatus as claimed in claim 24, wherein said mechanism comprises at least one lever for transforming the radial movement into the axial movement, wherein said manipulators act on said at least one lever.

27. The apparatus as claimed in claim 24, wherein said mechanism comprises at least one bell crank lever with attachment points between said inner mount and said outer mount being located in the region of the outer ends of a first lever of said at least one crank lever, and said manipulators acting in the region of the outer end of a second lever of said at least one crank lever which is in an angle to said first lever of said at least one crank lever.

28. The apparatus as claimed in claim 27, wherein said first and said second lever of said at least one crank lever are perpendicular to each other.

29. The apparatus as claimed in claim 24, further comprising sensors provided for position determination of the inner mount.

30. The apparatus as claimed in claim 29, wherein said sensors are designed as capacitive sensors.

31. The apparatus as claimed in claim 24, wherein said manipulators provided are hydraulic or pneumatic actuating members.

32. The apparatus as claimed in claim 24, wherein said manipulators provided are mechanical actuating members.

33. The apparatus as claimed in claim 24, wherein said manipulators provided are electrical actuating members.

34. A mounting apparatus for mounting a lens in a projection lens system for semiconductor lithography, comprising:
   an outer mount;
   an inner mount arranged within said outer mount;
   an optical element being adapted to said inner mount; and
   at least three articulations circumferentially arranged around said inner mount and between said inner mount and said outer mount, wherein each of said at least three articulations comprise a mechanism which transforms a radial movement into an axial movement.

35. The mounting apparatus of claim 34, wherein said manipulators providing a direction of force which is perpendicular to said axial movement.

36. The apparatus as claimed in claim 34, wherein said mechanism comprises at least one lever for transforming the radial movement into an axial movement, wherein said manipulators act on said at least one lever.

37. The apparatus as claimed in claim 36, wherein said mechanism comprises at least one bell crank lever with attachment points between said inner mount and said outer mount being located in the region of the outer ends of a first lever of said at least one crank lever, and said manipulators acting in the region of the outer end of a second lever of said at least one crank lever which is in an angle to said first lever of said at least one crank lever.

38. The apparatus as claimed in claim 34, wherein said first and said second lever of said at least one crank lever are perpendicular to each other.

39. The apparatus as claimed in claim 34, further comprising sensors provided for position determination of the inner mount.

40. The apparatus as claimed in claim 39, wherein the sensors are designed as capacitive sensors.

41. The apparatus as claimed in claim 34, wherein the manipulators provided are hydraulic or pneumatic actuating members.

42. The apparatus as claimed in claim 34, wherein the manipulators provided are mechanical actuating members.

43. The apparatus as claimed in claim 34, wherein the manipulators provided are electrical actuating members.

44. The apparatus as claimed in claim 36, wherein said lever of said mechanism changes the transmission proportion of said transfer from radial movement to axial movement.

45. The apparatus as claimed in claim 44, wherein said lever of said mechanism is located outside of the geometry of said inner mount and of said outer mount resulting in a greater force to said inner mount.

* * * * *